United States Patent [19]

Kaneko

[11] Patent Number: 5,243,692
[45] Date of Patent: Sep. 7, 1993

[54] TEXT PROCESSING DEVICE WITH DEVICE WITH SIMULTANEOUS DISPLAY AND PRINTING CAPABILITIES

[75] Inventor: Naohisa Kaneko, Aichi, Japan

[73] Assignee: Brother Kogyo Kabushiki Kaisha, Aichi, Japan

[21] Appl. No.: 489,682

[22] Filed: Mar. 7, 1993

[51] Int. Cl.⁵ .............................................. G06F 15/62
[52] U.S. Cl. .................................. 395/115; 395/116; 395/153
[58] Field of Search ................................ 364/518-522; 395/153-154, 115-116

[56] References Cited

U.S. PATENT DOCUMENTS 4,467,448  8/1984  Regehr et al. .................. 395/115
4,991,114  2/1991  Kawamura et al. .............. 364/519

Primary Examiner—Gary V. Harkcom
Assistant Examiner—Almis Jankus
Attorney, Agent, or Firm—Kane, Dalsimer, Sullivan, Kurucz, Levy, Eisele and Richard

[57] ABSTRACT

A text processing device is provided having a raster type CRT display and a printing unit. Codes corresponding to data to be displayed on the CRT display are stored in a memory which is updated during each vertical retrace period unless the device detects that a motor for the printing unit is activated in which case a fewer number of codes are rewritten into the memory.

16 Claims, 14 Drawing Sheets

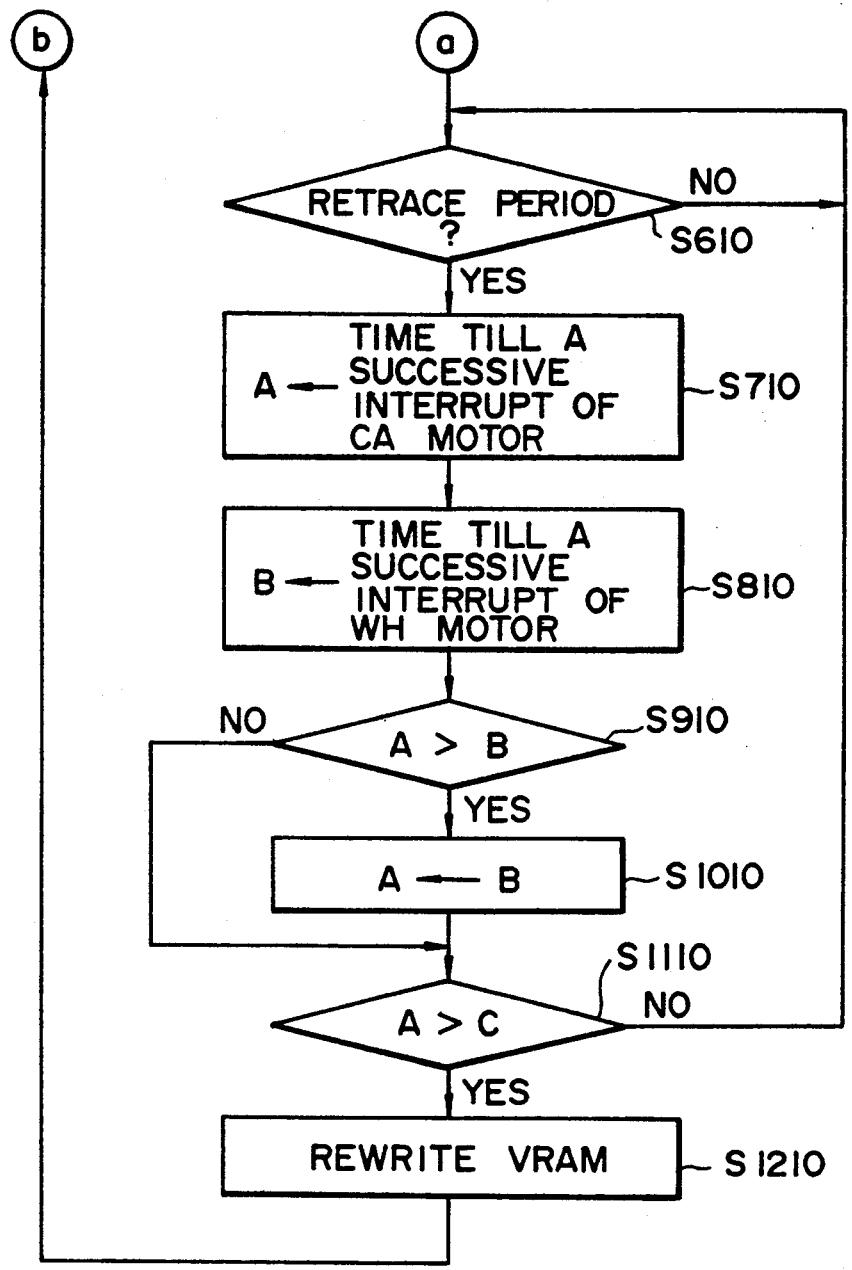

TEXT PROCESSING DEVICE WITH DEVICE WITH SIMULTANEOUS DISPLAY AND PRINTING CAPABILITIES

BACKGROUND OF THE INVENTION

The present invention relates to a text processing device having a display unit for representing the data corresponding to the inputted codes as well as a printing unit for printing the inputted data, while capable of replacing the codes stored in a video RAM(Random Access Memory, named VRAM, hereinafter) storing the codes corresponding to the data represented on the display unit along with a driving operation for driving, for example, a carriage and the like without an abnormality caused by the driving operation simultaneously executed with the above replacing operation.

Thus far, for example, in a text processing device having a function which edits inputted data through a keyboard and the like on a raster type CRT(Cathode Ray Tube) along with displaying them and prints the inputted data which has been edited by using a printing unit, simultaneously to control various drive motors which structure the printing unit and to replace the contents of the VRAM which structures the display control circuit of the raster type CRT for displaying the inputted data through the keyboard, two CPU (Central Processing Unit) devices, one of which controls the printing unit and the other controls the display control circuit, have been used.

However, in this prior art, because the two CPU devices for controlling both the printing unit and the display have to be used, it was difficult to reduce a product cost.

To solve the problem, it is possible to control the above two processes by using one CPU device. However, the following problems arise.

That is, in a text processing device such as a word processor, an operation which displays data on CRT along with printing the data is required. At the time, a process which replaces the contents of VRAM and a process which updates output phases of various drive motors of the printing unit are executed. However, because the contents of VRAM is replaced, the timings of the pulse update process of the drive motors may be delayed, the pulse widths may deviate and the drive motors may get disordered, i.e., the drive motors may become a so-called step out.

In addition, the VRAM replace process is executed during a vertical retrace period (hereinafter named the retrace period). To prevent the pulse signals from the above interfering, if the drive motors are controlled in the highest priority than others, because the major purpose of the text processing apparatus is to print text, it is necessary to wait for the VRAM replace process until the retrace period passes. If the wait time becomes long, the data may not be replaced in the retrace period. In this case, after the retrace period, since the VRAM replace process is continuously executed, the CRT screen flickers.

SUMMARY OF THE INVENTION

It is therefore an object of the present invention to provide an improved text processing device capable of executing a printing operation as well as a replacing operation of the VRAM simultaneously without an abnormality, wherein a product cost can be reduced.

For this purpose, according to the present invention, there is provided a text processing device capable of executing a data representing operation and a data printing operation simultaneously, comprising input means for inputting codes of characters and/or symbols, raster type display means, having a predetermined vertical retrace period, for visually representing data corresponding to the inputted codes, and print means, including at least one motor, for printing the data, said text processing device further comprising:

memory means for storing codes corresponding to the data displayed on said display means;

discriminate means for discriminating whether said motor is being driven;

replace means for replacing a predetermined amount of codes stored in said memory means during every said predetermined vertical retrace period in case that it is discriminated by said discriminate means that said motor is not driven; and change means for changing the amount of codes to be replaced during said predetermined vertical retrace period based upon the discrimination of said discriminate means.

DESCRIPTION OF THE ACCOMPANYING DRAWINGS

FIGS. 9, 9A and 9B are flow charts showing a structure of an another embodiment of the present invention.

DESCRIPTION OF THE EMBODIMENTS

Figure 1:
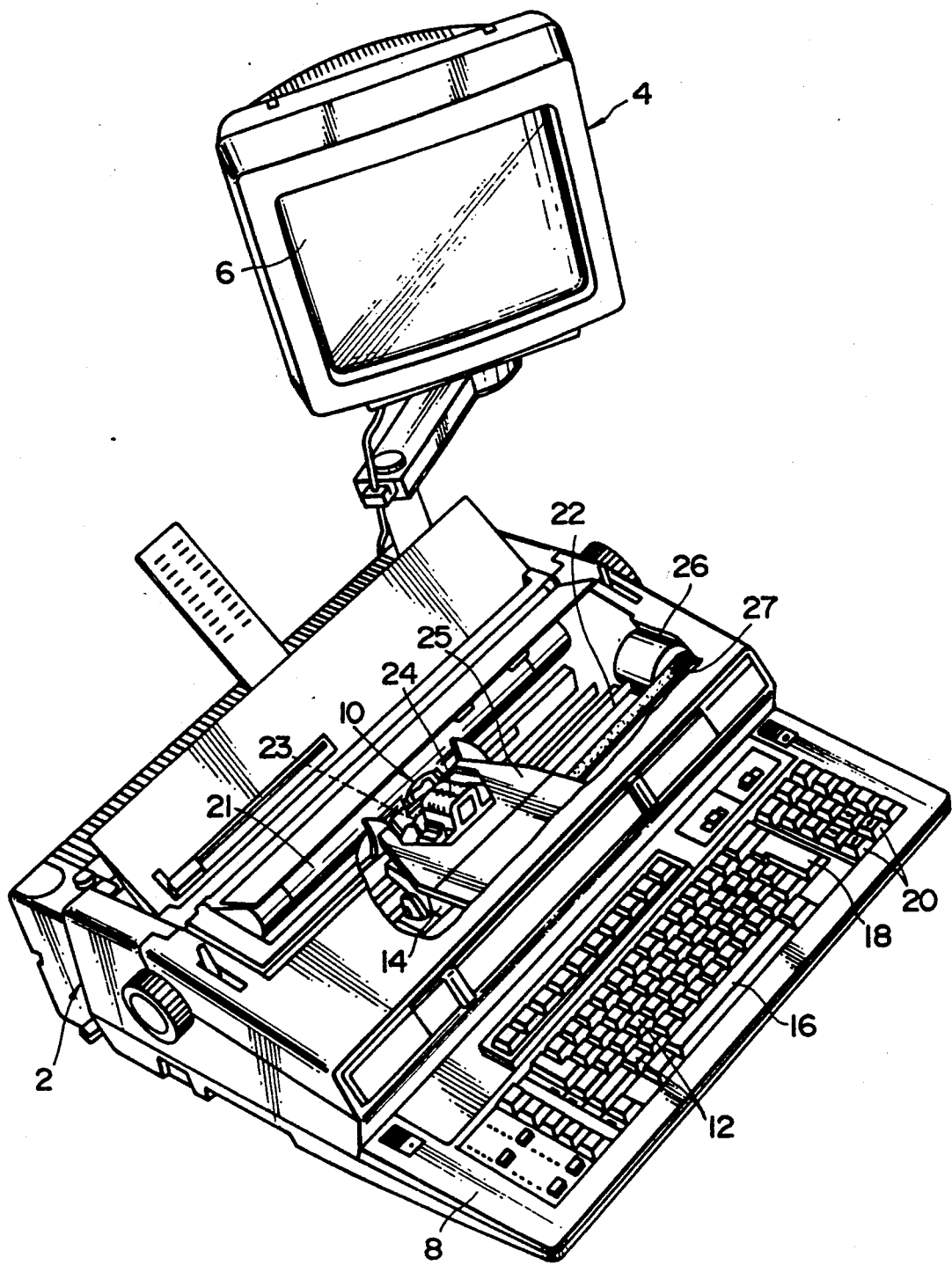
FIG. 1 is an external view of a text processing device embodying the present invention.

Referring to the drawings, an embodiment according to the text processing device according to the present invention is described hereinafter.

This device is structured, as shown in FIG. 1, by an electronic typewrite 2 and a raster type CRT(Cathode Ray Tube) display 4, hereinafter named the CRT, connected thereto as a display unit. The CRT 4 has a display screen 6 on which text data, frames, and the like are displayed.

The electronic typewriter 2 can be operated alone without using the CRT 4 as a typewriter for printing the character and/or symbol data, the electronic typewrite 2 comprising a keyboard 8 and a printing mechanism 10. The keyboard 8 is provided with various function keys such as character keys 12 for respectively inputting alphabet characters, numeric characters, and various symbolic characters, a space key 16 for rightwardly moving a carriage 14 described later for a space equivalent to one character, a return key 18 for commanding a line feed, and cursor movement keys 20 for vertically and horizontally moving a cursor which represents the input position on the display screen 6 of the CRT 4.

The printing mechanism 10 is provided with a platen 21 for supporting a printing sheet, not shown, on which a printing operation is executed and the carriage 14 movably supported along a pair of guide bars 22 disposed in parallel therewith. The carriage 14 is provided with a daisy wheel 23, a printing element selection motor, not shown, for placing the desired one of a plurality of elements of the daisy wheel 23 at a printing position, a printing hammer 24 for hitting the rear surface of the element placed at the printing position, a ribbon cassette 25 for housing a printing ribbon, a ribbon take-up motor, not shown, for taking up the printing ribbon, and so forth. The carriage 14 is reciprocally moved by a carriage drive motor 26 which is a step motor via a timing belt 27.

Figure 2:
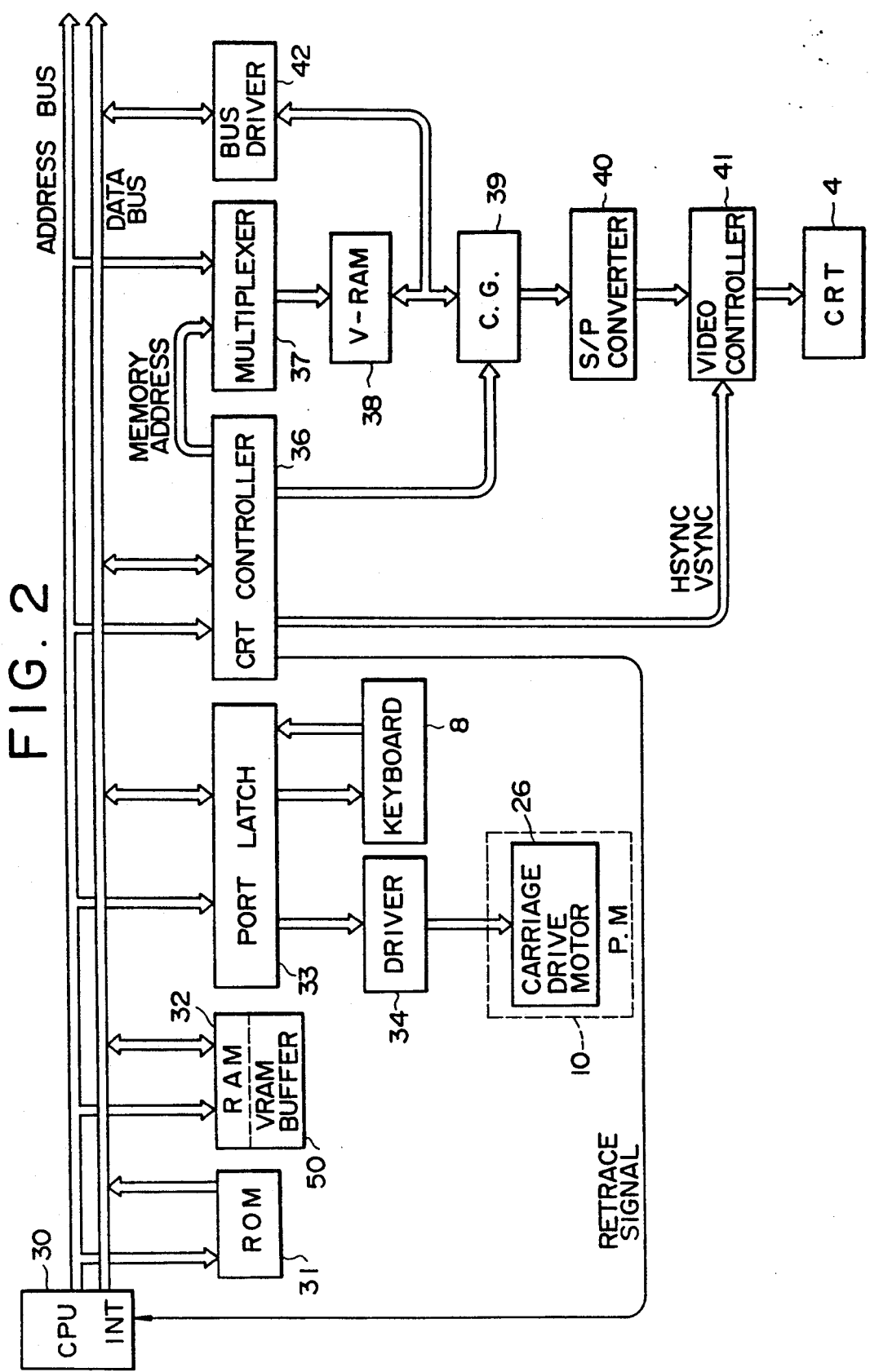
FIG. 2 is a block diagram of a control system for controlling the text processing device of FIG. 1.

Referring to FIG. 2, a control system of the device is described hereinafter.

This control system is a microcomputer control system which uses a CPU(Central Processing Unit) 30. The CPU 30 is controlled by a system program stored in a ROM(Read Only Memory) 31. Data are respectively inputted through each of the keys provided on the keyboard 8 via a port latch 33. When the input data for driving the step motors(in FIG. 2, only carriage drive motor 26 is shown) are inputted, the step motors structuring the printing mechanism 10, the CPU 30 starts a motor operation program which causes motor operation pulses to be outputted to each of step motors via the port latch 33 and a motor driver 34 and drives the each of step motors.

On the other hand, when the input data for changing a representation on the display of the CRT 4 are inputted, the CPU 30 starts a display change program which causes changing data to be sent to a video RAM(video Random Access Memory, named VRAM hereinafter) 38 via a bus driver 42 and the data to be written to the VRAM 38.

The data written in the VRAM 38 are inputted to a CG(Character Generator) 39 by a CRT controller 36 as well as a raster address and thereby a dot pattern of the assigned raster is input to a parallel-to-serial converter 40, i.e., shift register, in the form of parallel data. After that, the resultant data is converted into a serial dot pattern by the parallel-to-serial converter 40 and then inputted to a video controller 41. The video controller 41 composites the input dot pattern data with the video signal that the CRT controller 36 supplies and forms a display signal as to control the display screen 6 of the CRT 4.

A RAM(Random Access Memory) 32 is provided with a text memory in which key input code data has been written, various buffers, registers, counters, and so forth. Further, in the RAM 32, a VRAM buffer 50 for temporarily storing the rewrite data of the VRAM 38, described later, is provided.

The VRAM 38 is a buffer memory having memory addresses according to display addresses for data of one screen on the display screen 6 of the CRT 4. Each character requires two-bytes of memory capacity. The display data is stored using predetermined code data. As the display data, attribute data such as an under line, and so forth, are stored as well as character data.

The CRT controller 36 is a unit for displaying characters and the like on the CRT 4, the CRT controller 36 supplying memory addresses of predetermined high order bits necessary for the display to the VRAM 38 via an address multiplexer 37 and supplying raster addresses of predetermined low order bits to the CG 39. The CRT controller 36 directly supplies timing signals of both horizontal retrace HSYNC and vertical retrace VSYNC to a CRT board of a video controller 41. In addition, the CRT controller 36 supplies a retrace signal to the CPU 30.

In the CG 39, the display character data are stored as binary data in the unit of pixel. The character data to be selected are determined by a code stored in the VRAM 38. The character data according to the VRAM 38 are successively outputted to the address being inputted.

By referring to flowcharts shown in FIGS. 3 and 4, a data replace process of the VRAM 38 is described hereinafter.

Figure 3A:
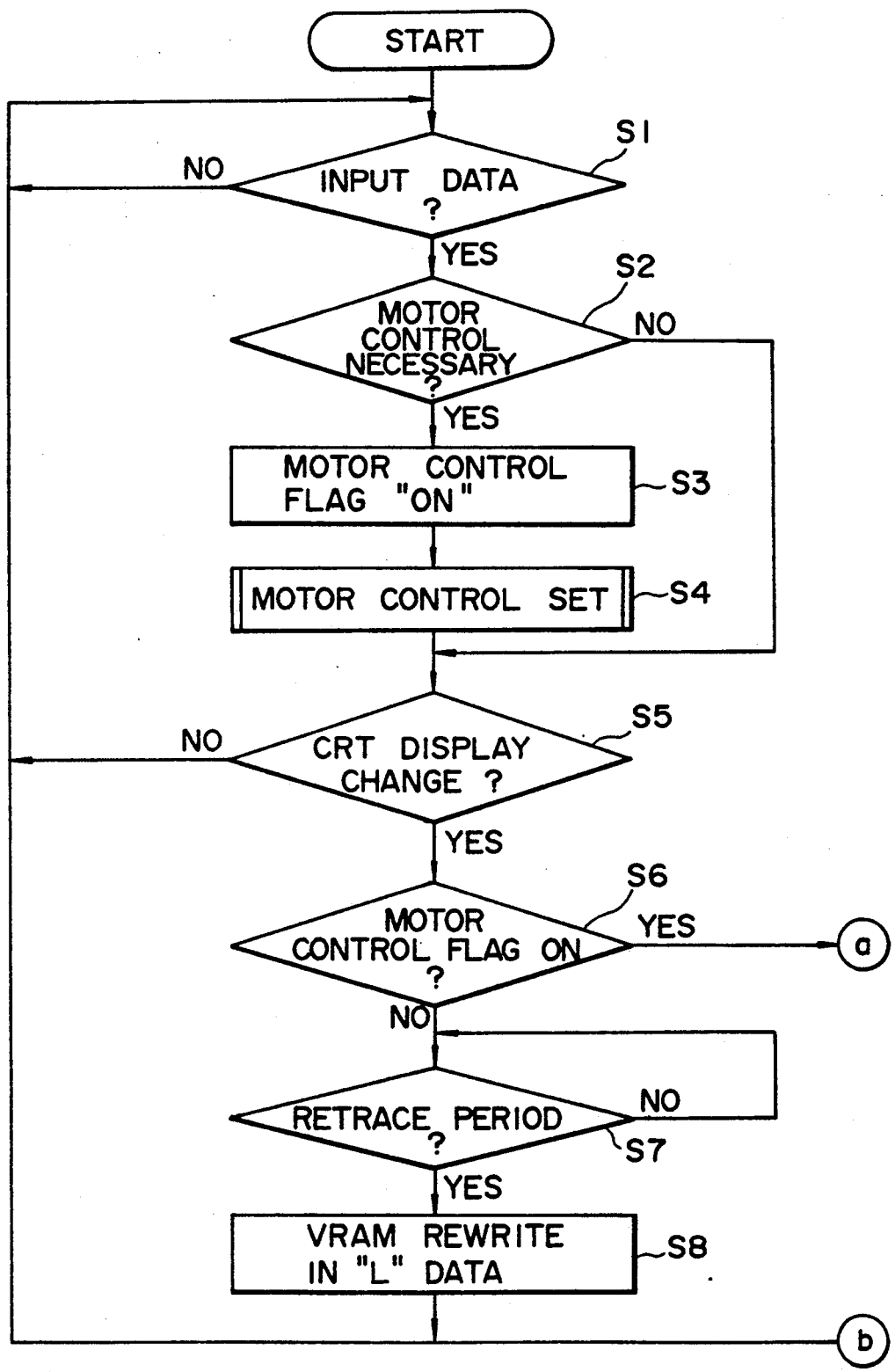
FIGS. 3, 3A, 3B and 4 are flow charts showing a structure of an embodiment of the present invention.
Figure 3B:
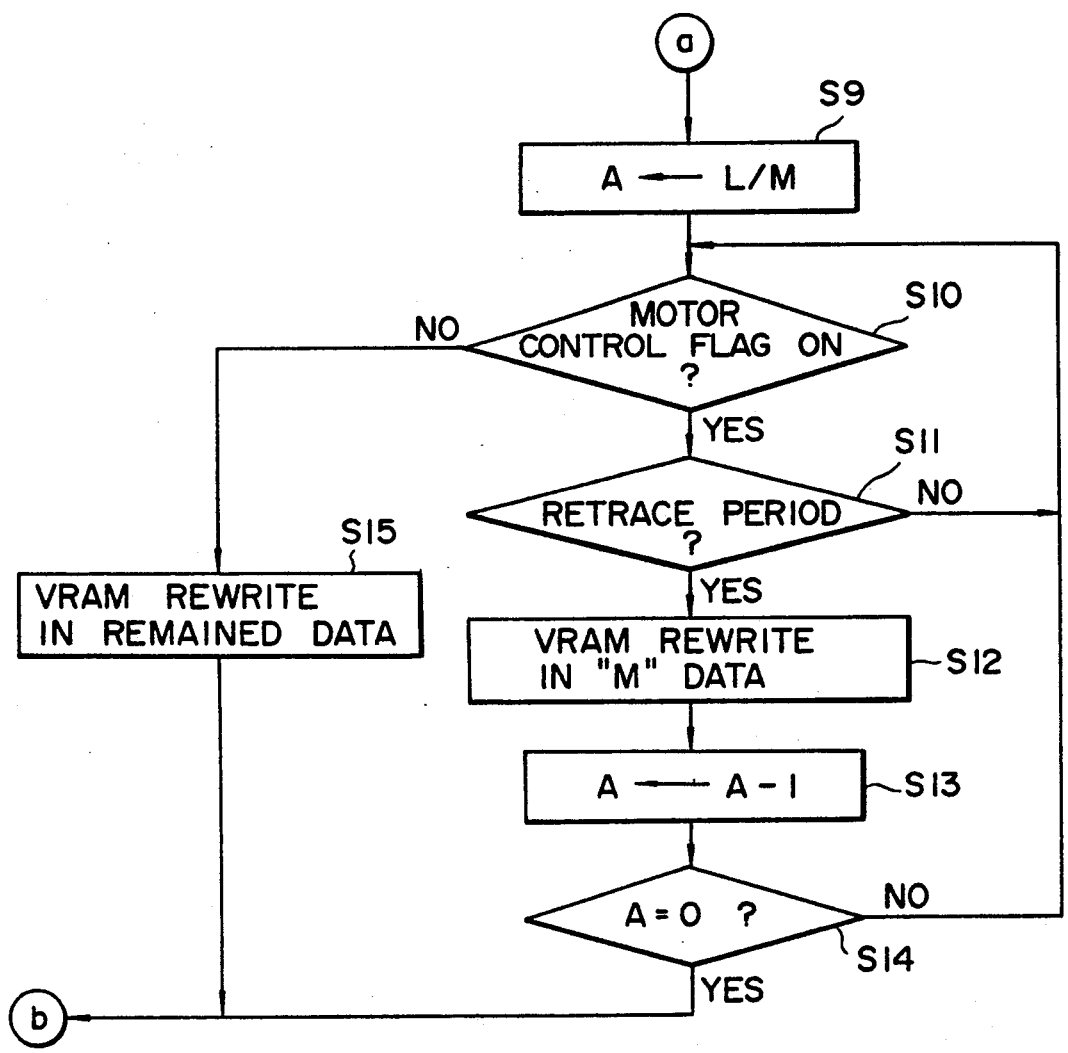
Figure 3:
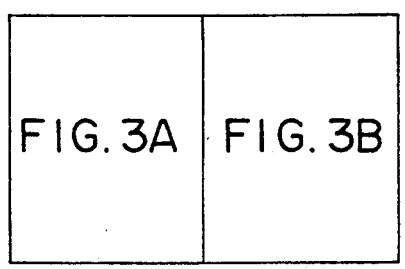

The routine shown in FIG. 3 is executed by a predetermined timer interrupt. First, in step S1, by a key operation on the keyboard 8, whether data has been entered or not is determined. This process is repeated until data is entered. When data is entered, the result of the determination in step S1 becomes YES. In step S2, the process determines whether the inputted is the data required for a motor operation or not.

When the motor operation is required, the process in step S3 turns on a motor operation flag. In step S4, the process sets motor operation parameters such as the number of steps, counting of dumping, pre-excitation time of period, and the like and starts driving the motor. The motor drive operation is started by means of an interrupt process shown in FIG. 4.

When the motor operation interrupt process is started, in step S20, the process determines whether the operation of the carriage drive motor 26 is completed or not. When the result of the determination in step S20 is NO, namely, when the operation of the carriage drive motor 26 is not completed, in step S21, the process drives the motor 26 in accordance with the motor operation parameters having been set at step S4. When the required operation of the motor 26 is completed, the process in S22 turns off the motor operation flag having been turned on.

In S21 the process outputs a predetermined control command from the CPU 30 to the data bus and the address bus. At the time, the output data is latched at the port latch 33. Thus, after that, the motor driver 34 drives the motor 26 in accordance with the control data being latched at the port latch 33.

When the motor operation interrupt process is complete, the process in step S5 shown in FIG. 3 is executed. This process determines whether the contents on the CRT 4 are changed or not. When the input data requires the motor to operate and the display of the CRT 4 to change, the result of the determination in step S5 becomes YES. When the result of the determination is NO, namely, when the input data does not require the display of the CRT 4 to change, the process returns back to step S1. When the result of the determination of step S5 is YES, the process in step S6 determines whether the motor operation flag has been turned on or not. When the motor is operating, since the motor operation flag has been already turned on, the result of the determination in step S6 becomes YES.

In this case, the process in step S9 is executed, namely, a value of L/M is stored in the accumulator where "L" is the maximum value of the data amount for replacing the content of the VRAM during one retrace period and "M" is the maximum value of the data amount for replacing the contents of the VRAM during the operation of the motor. However, "L" and "M" have been set so that the conditions of L>M and L=nM (n: predetermined integer) are satisfied. The value of M is the data amount for preventing the motor 26 from getting disordered even if the pulse output process for the control data of the motor 26 and the replace process of the VRAM 38 occur at the same time.

In other words, during the operation of the motor 26, the data amount which can be replaced while the motor 26 stops is divided into n equal portions and the data is replaced every a group of the data amount "M" in each retrace period. Step S11 is a retrace period wait process. In accordance with a timing signal which is output from the CRT controller 36, the process waits for the timing of the vertical retrace period. When the retrace period starts, the process in step S12 replaces the contents of the VRAM 38 for the amount of the replace data equivalent to "M". The process decrements the value of the accumulator A in step S13 and determines whether or not the result becomes 0 in step S14.

By the process of steps S11 through S14, the contents of the VRAM 38 are replaced every "M" pieces of data while n retrace periods start. Thus, even if the motor 26 is operating, the contents of the VRAM 38 can be replaced with preventing the operation of the motor 26 from getting disordered, i.e., without a so-called step out. The contents of the VRAM 38 are replaced every predetermined amount of codes whenever a retrace period starts. Thus, the time period of the replace process does not exceed the retrace period and the screen 6 of the CRT 4 does not flicker.

Before the retrace period starts or during the retrace period, when the motor operation is completed (when the motor operation flag is turned off, i.e., the result of the determination in step S10 is NO), the process advances to step S15. In the retrace period, the contents of the VRAM 38 are replaced for all the replace data. After that, the process returns back to step S1.

When the motor operation flag has been turned off in step S6, namely, when the motor 26 stops, the result of the determination in step S6 becomes NO. After that, the process of steps S7 and S8 is executed. When the motor 26 stops, even if the contents of the VRAM 38 is replaced, the operation of the motor 26 does not get disordered. Thus, it is possible to replace the entire data amount equivalent to "L" during one retrace period.

As described above, according to the text processing apparatus according to the present embodiment, even if the device is structured using one CPU, by changing the amount of data to be replaced in the VRAM in one retrace period depending on whether the motor stops or operates, the motor does not get disordered and the CRT screen does not flicker.

In the above embodiment, as the step motor, only the carriage drive motor has been exemplified. However, the control is performed for all the step motors such as the ribbon feed motor, ribbon lift motor, sheet feed motor, and the like.

By referring to the flow charts of FIGS. 5 and 6, an improved embodiment of the text processing device according to the invention is described hereinafter. For the processes in FIGS. 5 and 6 which are same as those in FIGS. 3 and 4, the same numbers are used.

Figure 5A:
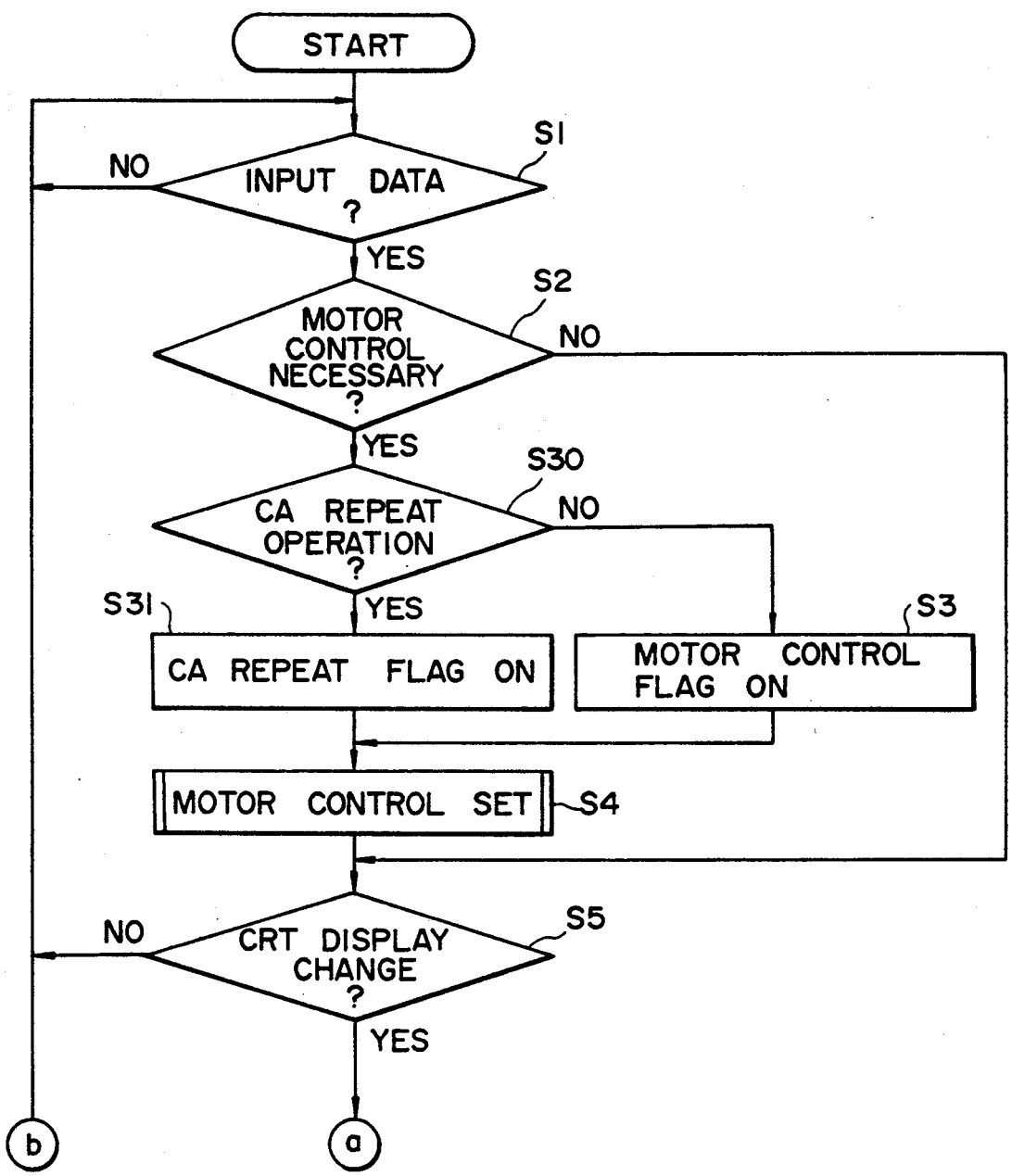
FIGS. 5, 5A, 5B and 6 are flow charts showing a structure of the improved embodiment.
Figure 5B:
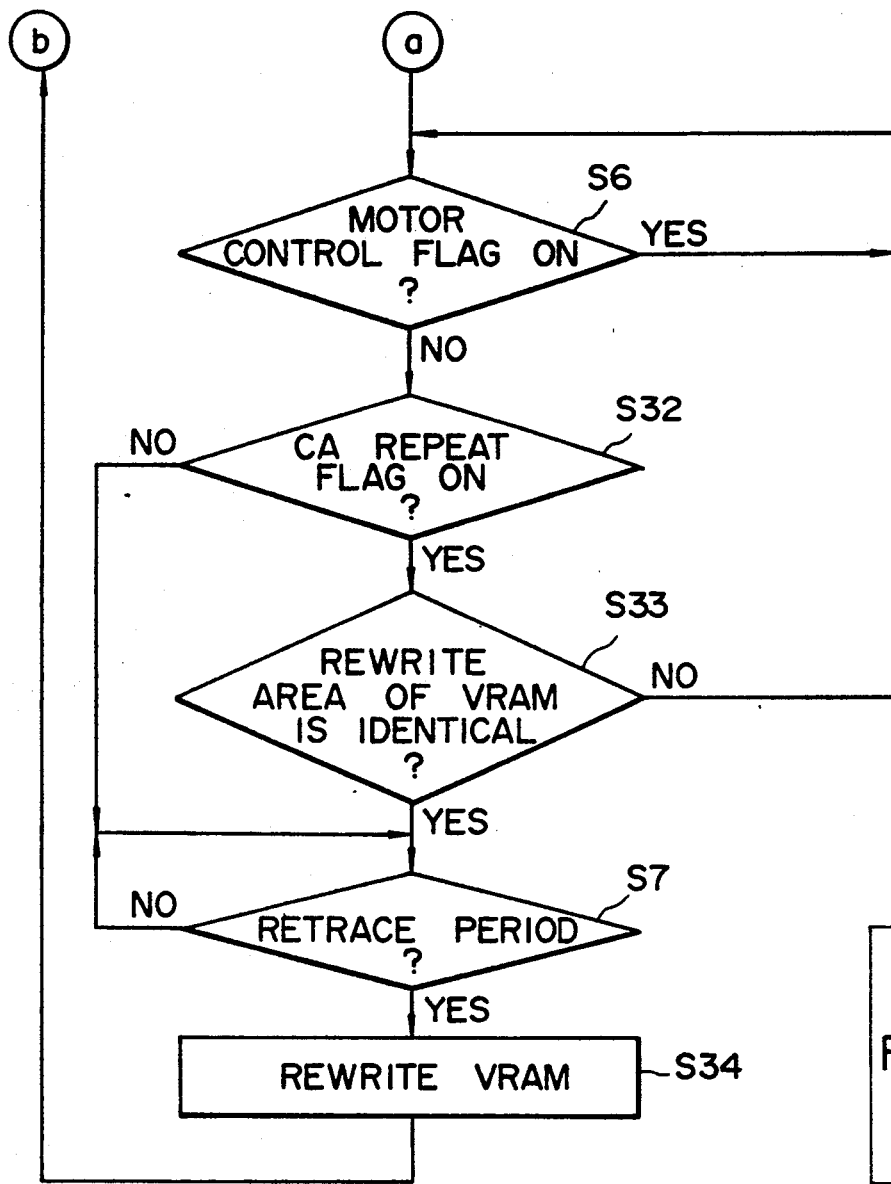
Figure 5:
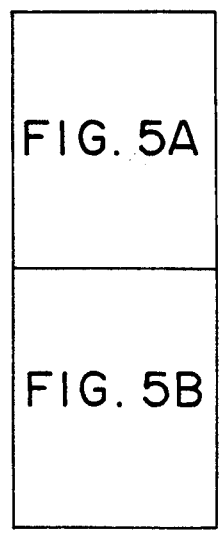

In FIGS. 5, data are inputted from the keyboard 8. When the contents of the input data requires the carriage drive motor 26 to drive, the process in step S30 is executed. The process in step S30 determines whether the input data requires a carriage repeat, named CA repeat hereinafter, operation or not. When the result of the determination is YES, the process in step S31 turns on the CA repeat operation flag. When the result of the determination in step S30 is NO, the process in step S3 turns on the motor operation flag.

Figure 6:
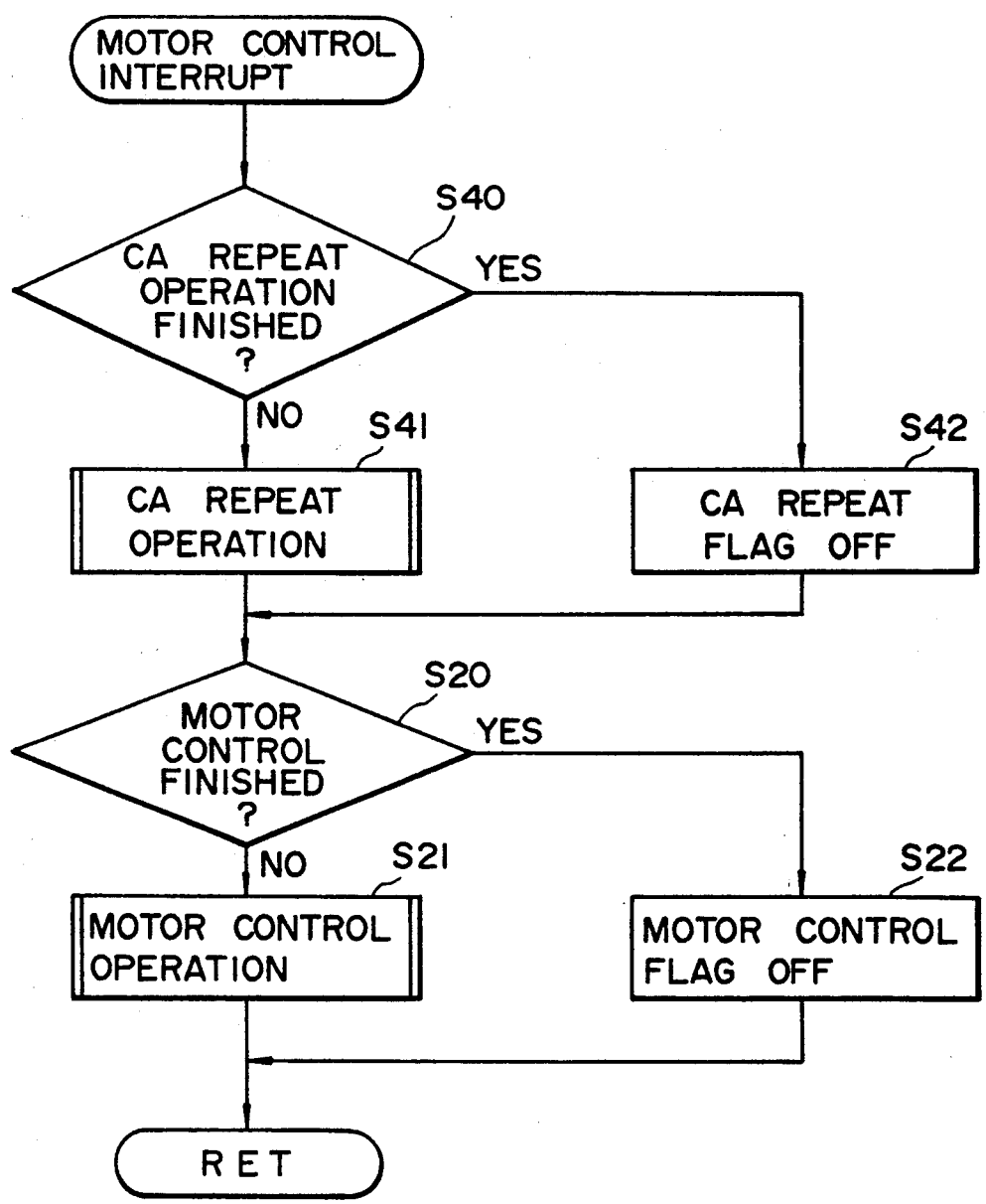

The process in step S4 sets the required motor operation parameters and executes the motor operation interrupt process shown in FIG. 6.

Figure 4:
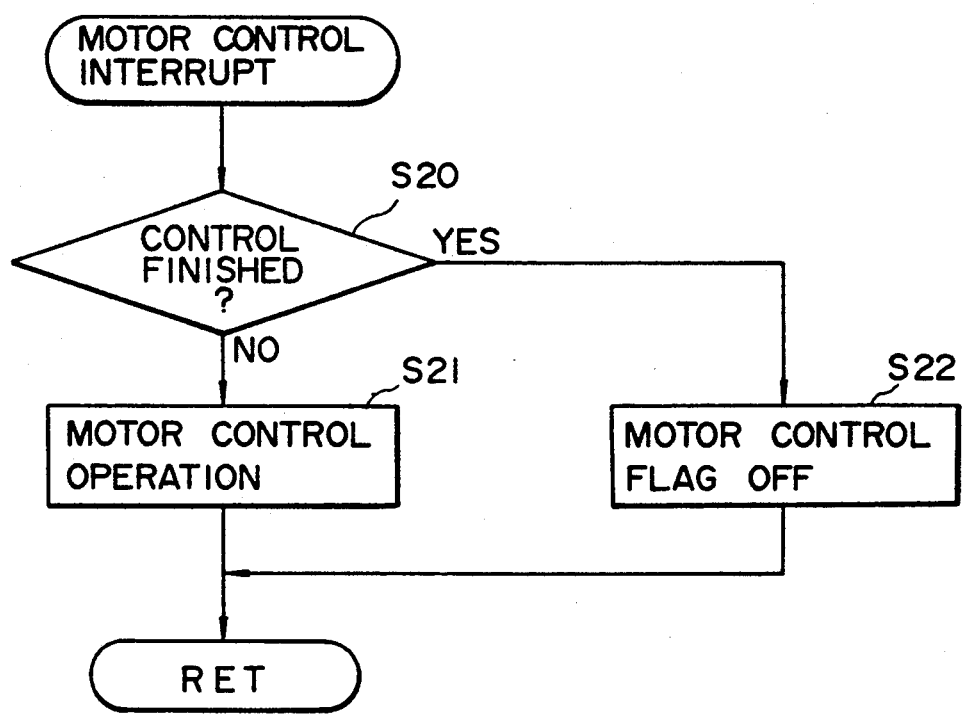

The motor interrupt process includes the routine process shown in FIG. 4 and the process of steps S40 through S42 for the CA repeat operation. Because the repeat operation of the carriage drive motor 26 should be precisely executed, it is necessary to prevent the carriage drive motor 26 from getting disordered.

To prevent that, in the motor operation interrupt process, the steps S40 through S42 are provided. The process in step S40 determines whether the CA repeat operation is completed or not. When it is not completed, the process in step S41 executes the CA repeat operation. When the repeat operation is completed, the process in step S42 turns off the repeat operation flag. The process of steps S20 through S22 is the same as that shown in FIG. 4. When this motor interrupt process is completed, the process in step S5 shown in FIG. 5 is executed. When the process determines that the display of the CRT 4 should be changed, the process in step S6 is executed. The process waits until the motor operation flag is turned off. During this time period, when the motor control command output process is completed, the process in steps S22 shown in FIG. 6 turns off the motor operation flag. Thus, the result of the determination in step S6 becomes NO and the process in step S32 is executed.

The process in step S32 determines whether the CA repeat operation flag has been turned on or not. When the result of the determination is YES, the process in step S33 is executed. The process in step S33 determines whether or not the replace data of the VRAM 38 accords with the predetermined area which has been assigned in advance. The predetermined area is an area for determining the data amount for which the carriage drive motor 26 does not get disordered while it is performing the repeat process even if the control command pulse output process and the replace process starts at the same time. For example, as a display area which is always displayed during the carriage repeat operation and which is changed time to time as the carriage or cursor is moved, there is a line representation portion (which is a portion displaying page number, line number, and column number, that is, a portion displayed at the upper right corner of the CRT screen 6).

As the determination method in step S32, in the line representation described above, since the display position is fixed, it can be determined by the address in the VRAM 38. In other words, because the line display position on the CRT display 6 just accords with the address of the VRAM 38, when the address of the replace data required accords with that of the line representation, it is determined that the data is the replace data of the line representation data.

When the result of the determination in step S33 is YES, the process in step S7 waits until the retrace period starts. In step S34 the process executes the replace process for the VRAM 38. At the time, the predetermined area described above (data area of the line representation) is replaced.

On the other hand, when the result of the determination in step S33 is NO, namely, when the replace data required during the repeat operation of the carriage drive motor 26 is not in the predetermined area, the process returns back to step S6. After that, the process in step S32 waits until the CA repeat operation is completed. In other words, during the CA repeat operation, the replace operation of the VRAM 38 allows only the line representation to be replaced.

Thus, during the CA repeat operation, only the line representation for the data amount for which the carriage drive motor 26 does not get disordered can be changed.

When the CA repeat operation is completed, i.e., when the motor operation is also completed, the result of the determination in step S32 becomes NO. The process in step S7 waits until the retrace period starts. The process in step S34 executes the replace process of the VRAM 38. The replace data are not limited to the data for the line representation, but all the replace data required.

As described above, according to the text processing device according to the above embodiments, even if the device is structured using one CPU, by setting a predetermined area for the data amount for which the carriage drive motor 26 does not get disordered and by executing the replace process only when the replace operation is required for the predetermined area, the motor does not get disordered during the CA repeat operation. In addition, the time period of the replace operation does not exceeds one retrace period, thereby preventing the CRT screen from flickering.

By referring to flowcharts shown in FIGS. 7 and 8, a data replace process of the VRAM 38 employable to the present invention is described hereinafter.

Figure 7:
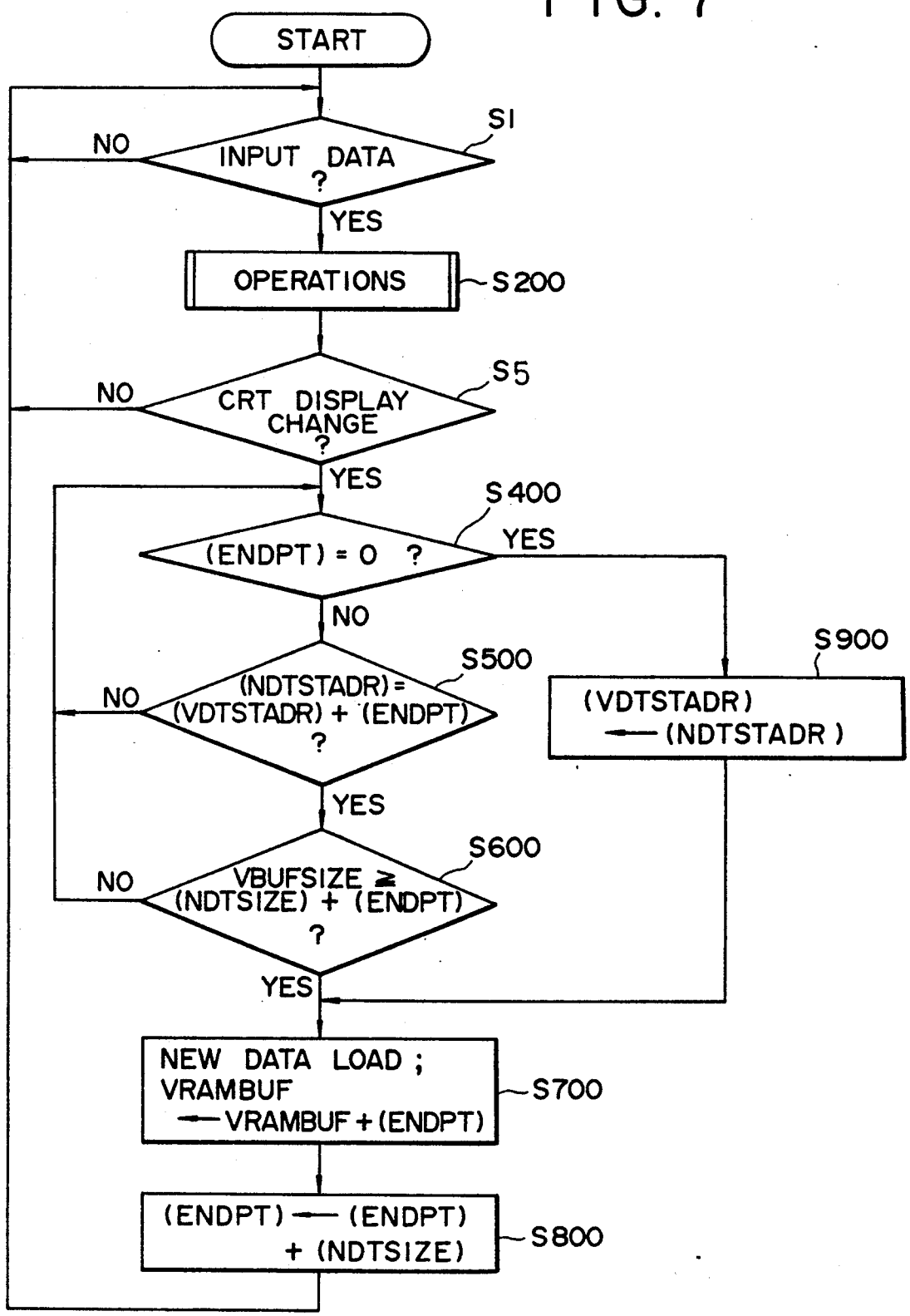
FIGS. 7 and 8 are flow charts showing an improved rewriting operation, using a vertical retrace period, employed in the present invention.

The routine shown in FIG. 7 is executed by a predetermined timer interrupt. After step S1, a predetermined process corresponding to the inputted data, including the operation of the motor described above, is executed in step S200. For example, when the input data is the data for requiring the operation of the motor, the process sets the motor operation parameters such as the number of steps, counting of dumping, time of period of the pre-excitation, and so forth and starts driving the motor. The motor is driven by executing another interrupt process not shown. In the motor drive interrupt process, as described above, a predetermined control commands are output from the CPU 30 to the data bus and the address bus. At the time, the output data is latched by a port latch 33. Thus, after that, a motor driver 34 drives the motor 26 according to the control command latched in the port latch 33.

The process in S5 determines whether to change the display of the CRT 4. In other words, when the data being inputted from the keyboard 8 is the data for requiring the display screen 6 of the CRT 4 to change, the result of the determination in step S5 becomes YES. When the result of the determination in step S5 is NO, namely, when the input data is the data which does not require the display of the CRT 4 to change, the process returns back to step S1.

When the result of the determination in step S5 is YES, the process in step S400 determines whether an end pointer ENDPT (hereinafter, named ENDPT) which stores the end of the replace data stored in the VRAM buffer 50 is 0 or not. In other words, when ENDPT has been set to 0, the replace data are not stored in the VRAM buffer 50.

When the result of the determination in step S400 is YES, the process in step S900 replaces the contents of the start address of the VRAM write data (hereinafter, named VDSTADR) to a new start address NVDTSTADR of the new VRAM write data. In other words, when replace data occurs, the start value (NVDTSTADR) which assigns the address of the new replace data is inputted to a register which stores the start value of an address which assigns the replace area for the replace process of the VRAM 38.

The process in step S700 loads new data from an address where ENDPT is added to the start address VRAMBUF (hereinafter named VRAMBUF), namely, from the location of VRAMBUF, because ENDPT=0 in this case.

After that, the process in step S800 moves the location of ENDPT to the end location where the new data has been stored, namely, in the location of ENDPT+NDTSIZE where NDTSIZE is the data amount of the new data.

On the other hand, when the result of the determination in step S400 is NO, namely, in the event that a VRAM 38 replace command occurs by the inputted data, when the replace data has been stored in the VRAM buffer 50, the process in step S500 determines whether the value of NVDTSTADR is equal to the value where the value of VDTSTADR is added to that of ENDPT or not. This process determines whether the new data continues after the display address of the last replace data which has been stored in the VRAM buffer 50. Thus, for the new data which does not continues on the screen 6 of the CRT 4, the result of the determination in step S500 becomes NO. The process returns back to step S400 and waits until the result of the determination in step S400 becomes YES. When the result of the determination becomes YES, the process advances to step S900 and then the process stores the new data in a separate location as the start data of the VRAM buffer 50 (in steps S700 and 800).

On the other, when the result of the determination in step S500 is YES and the process in step S600 determines whether or not the new data stored in the VRAM buffer 50 exceeds the data amount VBUFSIZE (hereinafter, named VBUFSIZE) storable in the VRAM buffer 50. In other words, the process determines whether or not the value where the value of ENDPT is added to that of NDTSIZE is less than that of VBUFSIZE.

When the result of the determination in step S600 is NO, the process returns back to step S400. The process waits until the result of the determination in step S400 becomes YES. When the result of the determination in step S400 becomes YES, the process advances to step S900. After that, the new data which has not been stored in the VRAM buffer 50 is stored as the start data of the VRAM buffer 50 (in steps S700 and 800).

On the other hand, when the result of the determination in S600 is YES, since data can be successively written to the VRAM buffer 50, the new data is written after the end data in the VRAM buffer 50. After that, in step S800, the location of ENDPT is updated.

As described above, whenever a display change is commanded by the input data, the replace data are successively and temporarily stored in the VRAM buffer 50. The replace data temporarily stored in the VRAM buffer 50 is written to the VRAM 38 by an interrupt process shown in FIG. 8 during one retrace time period.

Figure 8:
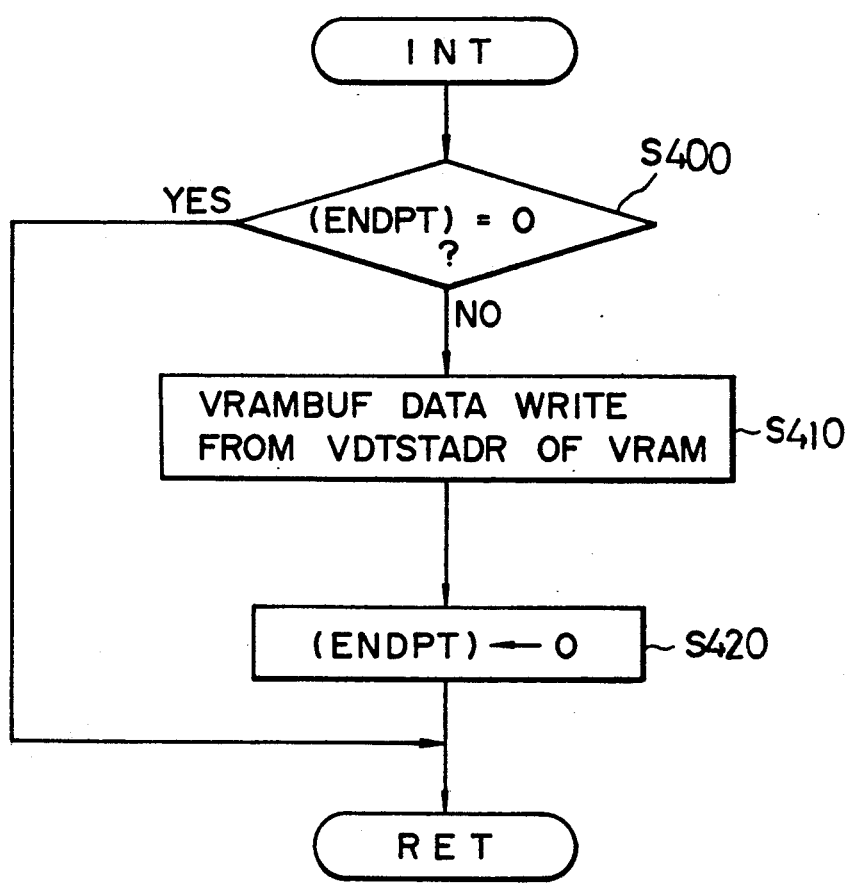

The interrupt process shown in FIG. 8 is started by a retrace signal which is inputted from the CRT controller 36 to the CPU 30. First, in step S400, the process determines whether the value of ENDPT is 0 or not. When ENDPT=0, because no replace data has been stored in the VRAM buffer 50, the replace operation of the VRAM 38 is not required and thereby the interrupt process is terminated.

On the other hand, when the result of the determination in step S400 is NO, the process in step S410 writes the replace data in the VRAM buffer 50 to the VRAM 38. At the time, the start address of the data being written in the VRAM 38 is VDTSTADR stored in step S900 of FIG. 7, namely, the start address of the replace data which has been first stored in the VRAM buffer 50.

Although the data replace process for the VRAM 38 is executed during one retrace period, since the data amount of the VRAM buffer 50 is set to that replaceable during one retrace period, the period of the replace operation of the VRAM 38 does not exceed one retrace period, thereby preventing the screen 6 of the CRT 4 from flickering.

When the process in step S410 is terminated, the process in step S240 clears the location of ENDPT. Thus, by which the next retrace period starts, the routine process shown in FIG. 8 is executed and the replace data are stored from the start location of the VRAM buffer 50.

Figure 9A:
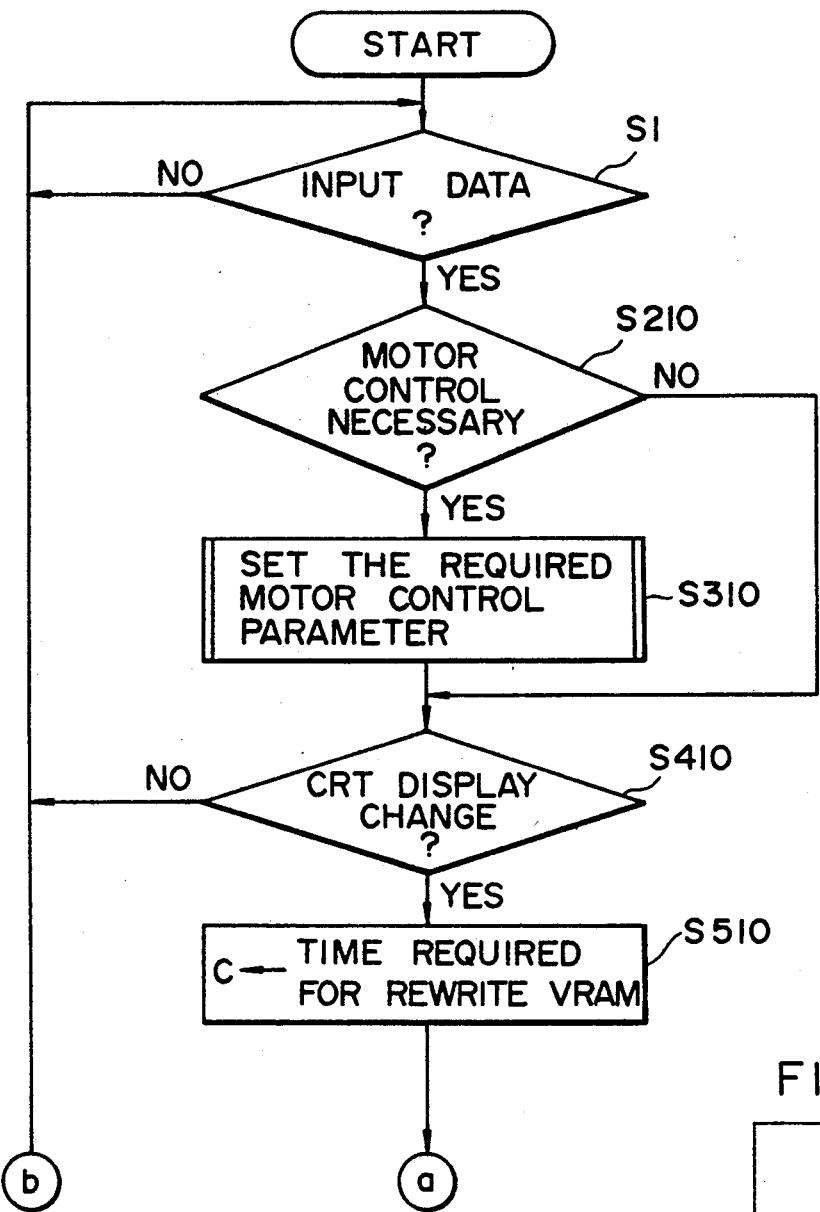
Figure 9:
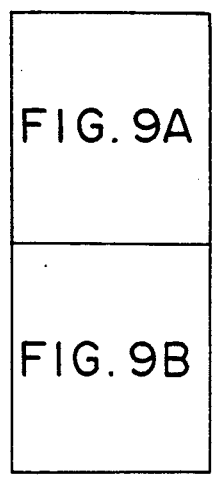

Referring to a flow chart shown in FIG. 9, an another embodiment of the present invention is described hereinafter. The routine shown in FIG. 9 is executed, such as the above embodiment, by a predetermined timer interrupt. First, in step S1, the process determines whether or not data has been input by a key operation on the keyboard 8, same as the above embodiment. This process is repeated until data is inputted. When data is inputted, the result of the determination in step S1 becomes YES. In step S210, the process determines whether or not the data requires the motor to drive.

When the motor operation is required, the process in step S310 sets motor, including a printing hammer drive solenoid, operation parameters for the number of steps, counting of dumping, pre-excitation time period, and the like and starts driving the motor. The motor operation parameters are intermittently output by the timer interrupt process controlled by a predetermined timer. In other words, when a timer interrupt timing occurs, a predetermined control command is output from the CPU 30 to a data bus and an address bus. The output data is latched by a port latch 33. After that, a motor driver 34 drives a motor 35 according to data being latched by a port latch 33.

The interrupt process which outputs the motor operation parameters is executed whenever the interrupt timing occurs in a higher priority than the routine which is being executed. The process in step S410 determines whether to change the display of the CRT 4. When the input data from the keyboard 8 requires the motor to operate and the display screen 6 of the CRT 4 to change, the result of the determination in step S410 becomes YES. When the result of the determination is NO, namely, when the input data does not require the display of the CRT 4 to change, the process returns back to step S1.

When the result of the determination in step S410 is YES, the process in step S510 computes a time period necessary for replacing the contents of the VRAM 38 and stores it in a register "C". It may be considered that the time period is a predetermined fixed value. The process in step S610, which is a retrace period wait process, waits until the timing of a vertical retrace period starts according to a timing signal which is output from a CRT controller 36. When the retrace period starts, the process advances to step S710.

The process in step S710 computes the remaining time period until the next interrupt process of a carriage drive motor 26 occurs and stores the result in a register "A". The remaining time period is computed by checking the remaining count number of a specific timer used in the timer interrupt process (as the timer, generally a counter is used). The process in step S810 computes the remaining time period until the next interrupt process of a wheel drive motor (hereinafter named the WH motor) occurs and executes a process which stores the result in a register "B".

The process in S9 compares the content of the register A with that of the register "B". When A>B, the process in step S1010 executes a process which moves the value of "B" to "A". On the other hand, when A<B, the process in step S1110 compares the content of "A" with that of "C". In other words, this process determines whether the time period "C" necessary for rewriting the content of VRAM 38 is smaller than the remaining time period of "A" or "B" whichever smaller.

When the result of the determination in step S1110 is YES, since the rewrite operation of VRAM can be completed by occurrences of the control commands of the CA motor 26 and the WH motor, in step S1210, the replace operation of the VRAM 38 is executed. At the time, because the result of the determination in step S610 is YES, the retrace period starts. On the other hand, when the result of the determination in step S1110 is NO, although the retrace period starts, when the replace operation of the VRAM 38 is executed, the motor pulse update timing occurs before the process is completed. However, since the motor operation cannot be executed until the VRAM replace process is completed, the pulse width may deviates and the motor operation may get disordered. To prevent that, the process returns back to step S610 and waits until the result of the determination in step S1110 becomes YES, namely, until the retrace period starts. When the motor operation interrupt is completed, the interrupt counting operation is stopped and a value which is larger than the maximum value of the replace time period of VRAM is set so that the result of the determination in step S1110 always becomes YES. At the time, the replace process of the VRAM 38 is completed.

As described above, according to the text processing device according to the present embodiment, even if it is structured using one CPU 30, by executing the replace process of VRAM every retrace period during the interval period of the interrupt process for controlling the motor operation, the motor operation does not get disordered. In addition, in the following assumption, $$Tv > Rmax + IPmax$$

where,
Tv: vertical retrace period,
Rmax: maximum time of replace process
IPmax: maximum time of interrupt prohibit
since the time period of the replace process of VRAM does not exceed the retrace period, the display screen 6 of the CRT 4 does not flicker.

Then, by referring to the flow charts of FIG. 10 and 11, a still another embodiment of a text processing device according to the present invention is described hereinafter. In the flow charts, the same processes as FIG. 9 use the same numbers.

Figure 10:
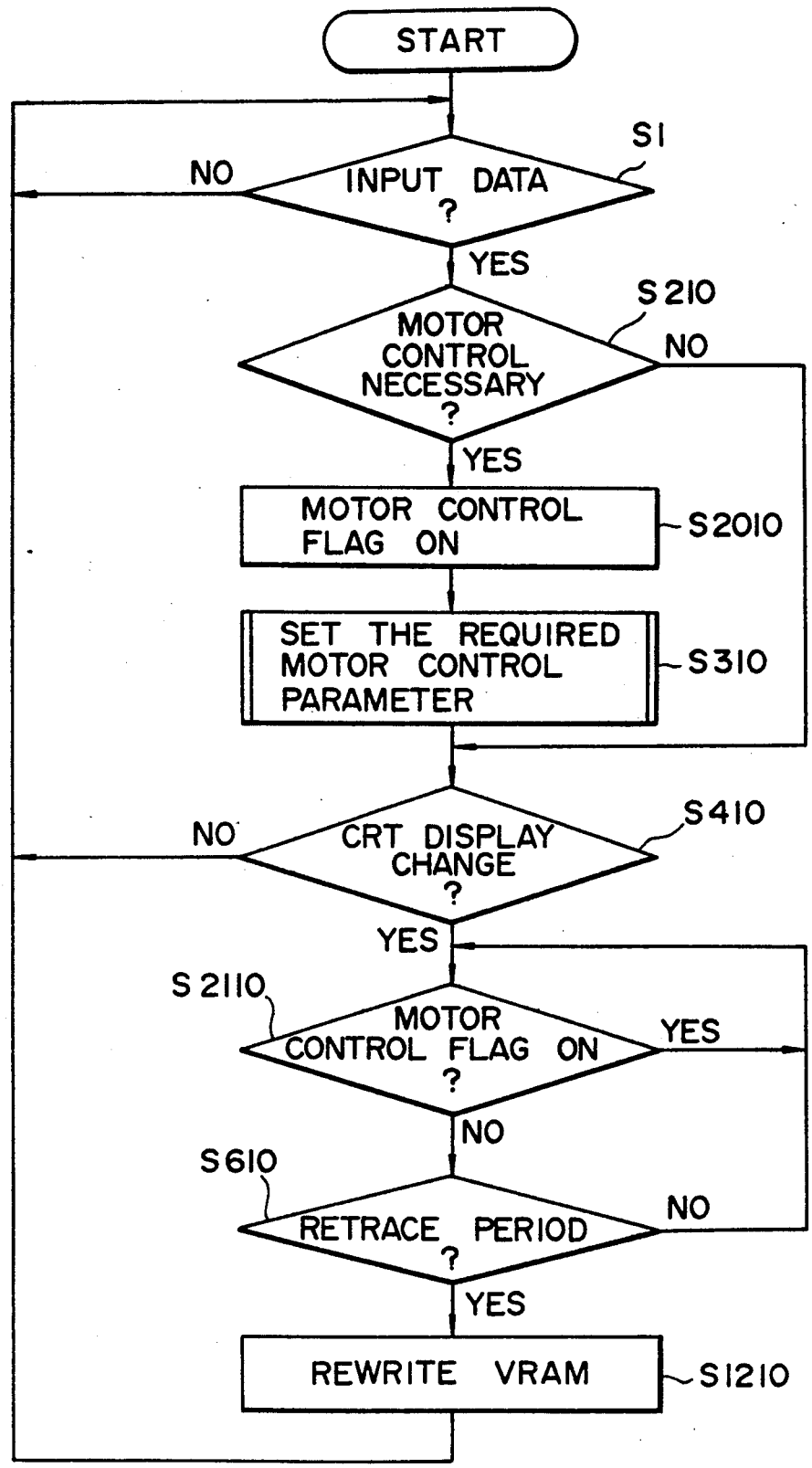
FIGS. 10 and 11 are flow charts showing a structure of a still another embodiment of the present invention.

In FIG. 10, when data is input from the keyboard 8 by a key operation and the input data requires a motor operation, the process advances to step S2010. In step S2010, the process turns on a motor operation flag.

Figure 11:
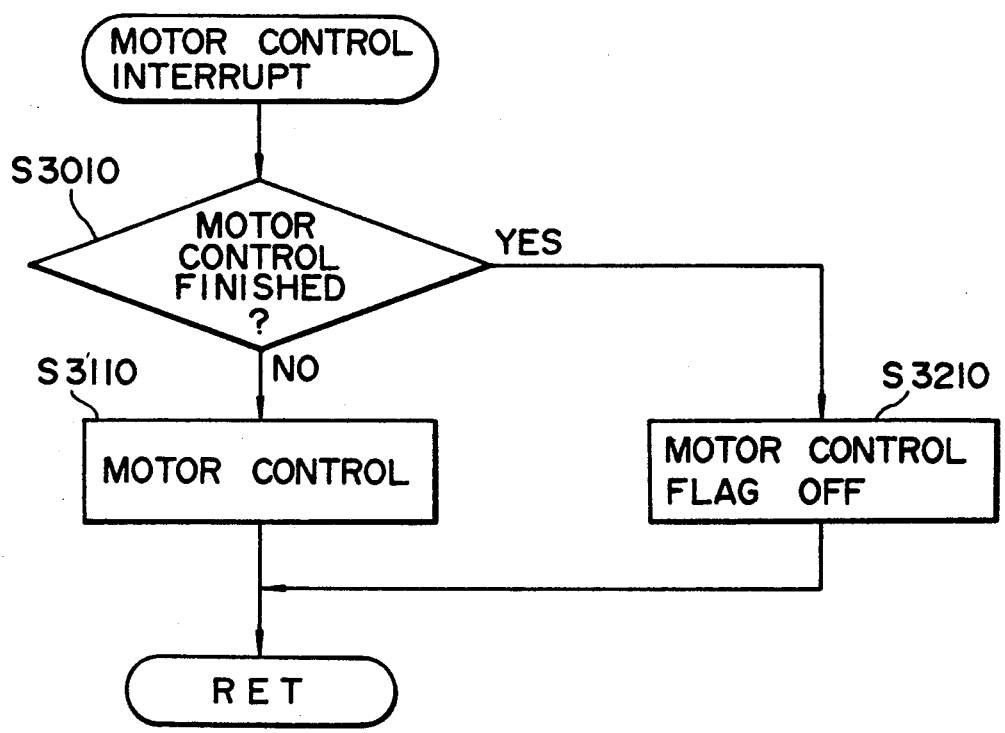

In step S310, the process sets required operation parameters and executes a motor operation interrupt process shown in FIG. 11.

The motor interrupt process includes the motor control interrupt process executed in step S310 of the embodiment shown in FIG. 9 and the process of step S3010 and S3210. In step S3010 the process determines whether the motor operation is completed or not. When the result of the determination is YES, in step S3210 the process turns off the motor operation flag. When the result of the determination in step S3010 is NO, the process advances to step S3110 and executes a motor control command output process.

After that, the process advances to step S410 shown in FIG. 10. In this step, when the process determines to change the display of the CRT 4, in step S2110 the process waits until the motor operation flag is turned off. When the motor control command output process is completed during that, in step S210 the process turns off the motor operation flag. Thus, since the motor operation flag is turned off in step S3210 shown in FIG. 11, the result of the determination in step S2110 becomes NO and the process advances to step S610. When the retrace period starts, in step S1210 the process executes the replace process of the VRAM 38.

As described above, according to the text processing device of the present embodiment, even if it is structured using one CPU 30, the process prohibits the replace process of the VRAM 38 and permits the replace process only when the motor operation stops, as shown in step S2110. Thus, by executing the replace process, the motor operation control command process and the replace process of the VRAM 38 do not occur at the same time. Consequently, the disorder of the motor operation can be completely prevented. In addition, since the rewrite process of VRAM is executed when the motor stops, the time period of the process does not exceed one retrace period, thereby preventing the screen 6 of the CRT 4 from flickering.

What is claimed is:

1. A text processing device for executing a data printing operation and simultaneously displaying the data on a raster type display means, said device comprising input means for inputting character and symbol codes, a raster type display means having a predetermined vertical retrace period, for visually representing data corresponding to inputted character and symbol codes, and print means for printing the data, said printing means including at least one motor for driving the print means, said text processing device further comprising:
   memory means for storing codes corresponding to data displayed on said display means;
   discriminate means for discriminating whether said motor is being operated to drive said print means;
   replace means for replacing a predetermined amount of codes stored in said memory means during every said predetermined vertical retrace period if said motor is not being operated;
   first calculate means for calculating a time period for said motor to reach a predetermined state, and said predetermined vertical retrace period starts if it is discriminated by said discriminate means that said motor is not being driven;
   second calculate means for calculating a a period of time required for rewriting the codes stored in said memory means;
   compare means for comparing the time periods calculated by said first and second calculating means; and control means for controlling said replace means so as to replace the codes stored in said memory means if the time period calculated by said first calculate means is larger than that calculated by said second calculate means.

2. The text processing device according to claim 1, wherein said predetermined state of said motor is a step out state in which a driving phase of said motor is slipped.

3. The text processing device according to claim 2, wherein said motor comprises a step motor controlled by a pulse train having a predetermined interrupt timing period so as to be driven, and wherein said first calculate means calculates a value corresponding to a time period for successive interrupt timing.

4. The text processing device according to claim 3, wherein said first calculate means calculates a time till a trailing edge of said pulse train.

5. The text processing device according to claim 4, wherein said first calculate means includes a timer means for setting a time period corresponding to a period of time of said pulse train at said interrupt timing, said timer means being operated to change a set value in a predetermined manner if said value is set, whereby if the vertical trace period starts the changed value comprises a value corresponding to a time for a trailing edge of said pulse train.

6. The text processing device according to claim 5, wherein said timer means further sets a value larger than that corresponding to a time required for replacing the codes stored in said memory means in case that said motor is not driven.

7. The text processing device according to claim 1, wherein said print means further includes at least one motor member, and wherein said first calculate means calculate values corresponding to a period for said motor to reach said predetermined state.

8. The text processing device according to claim 7, wherein said predetermined state is a step out state in which a driving phase of each of said motors is slipped.

9. The text processing device according to claim 8, wherein said motors comprise a carriage driving motor and a wheel driving motor.

10. A text processing device for executing a data printing operation and simultaneously displaying the data on a raster type display means, said device comprising;
   input means for inputing character and symbol codes;
   a raster type display means having a predetermined vertical retrace period, for visually representing data corresponding to inputted character and symbol codes;
   print means for printing the data, said print means including a carriage for mounting a printing unit;
   a motor for driving said carriage;
   memory means for storing codes corresponding to data displayed on said display means;
   discriminate means for discriminating whether said motor is being operated to drive said print means;
   replace means for replacing a predetermined amount of codes stored in said memory means during every said predetermined vertical retrace period if said motor is not being operated;

change means for changing the predetermined amount of codes to be replaced during said predetermined vertical retrace period in response to said discriminate means;

another discriminate means for discriminating if said carriage drive motor is being driven in a predetermined manner; and, another replace means for replacing a third predetermined amount of codes stored in said memory means during said vertical retrace period if said motor is being driven in said predetermined manner.

11. The text processing device according to claim 10 wherein said predetermined state is a carriage repeat state in which said carriage is driven to be backwardly moved, and said third predetermined amount of codes comprises the amount of codes corresponding to those required for a line representation, said line representation including the representation relating to the present position of said carriage.

12. A text processing device for executing a data printing operation and simultaneously displaying the data on a raster type display means, said device comprising input means for inputting character and symbol codes, a raster type display means having a predetermined vertical retrace period, for visually representing data corresponding to inputted character and symbol codes, and print means for printing the data, said printing means including at least one motor for driving the print means, said text processing device further comprising:

memory means for storing codes corresponding to data displayed on said display means;

discriminate means for discriminating whether said motor is being operated to drive said print means;

replace means for replacing a predetermined amount of codes stored in said memory means during every said predetermined vertical retrace period if said motor is not being operated; and, change means for changing the predetermined amount of codes to be replaced during said predetermined vertical retrace period in response to said discriminate means, wherein said change means changes said amount of codes if said discriminate means determines that said motor is being driven into a second predetermined amount of codes which is less than said predetermined amount of codes.

13. The text processing device according to claim 12, wherein said another predetermined amount of codes is defined by the following equation:

$$M = L/n$$

where,
M = another predetermined amount of codes;
L = predetermined amount of codes;
n = predetermined integer.

14. The text processing device according to claim 12 wherein said another predetermined amount of codes is zero,
whereby a replacing operation by said replace means is not executed in case that said motor is driven.

15. A text processing device for executing a data printing operation and simultaneously displaying the data on a raster type display means, said device comprising input means for inputting character and symbol codes, a raster type display means having a predetermined vertical retrace period, for visually representing data corresponding to inputted character and symbol codes, and print means for printing the data, said printing means including at least one motor for driving the print means, said text processing device further comprising:

memory means for storing codes corresponding to data displayed on said display means, said memory means comprising a video random access memory with a buffer area having a predetermined capacity for storing codes to be replaced;

discriminate means for discriminating whether said motor is being operated to drive said print means;

replace means for replacing a predetermined amount of codes stored in said memory means during every said predetermined vertical retrace period if said motor is not being operated; and, change means for changing the predetermined amount of codes to be replaced during said predetermined vertical retrace period in response to said discriminate means.

16. The text processing device according to claim 15 which further comprises detect means for detecting a code stored at a largest numeral address in said buffer area, and write means for writing additional codes into said buffer area from an address succeeding to said largest numeral address.

* * * * *